United States Patent [19]

Mager

[11] Patent Number: 5,677,995
[45] Date of Patent: Oct. 14, 1997

[54] METHOD AND APPARATUS FOR IMPLEMENTING TDM FUZZY CONTROL

[75] Inventor: Klaus Mager, Unterkirnach, Germany

[73] Assignee: Deutsche Thomson-Brandt GmbH, Villingen-Schwenningen, Germany

[21] Appl. No.: 256,205

[22] PCT Filed: Dec. 4, 1992

[86] PCT No.: PCT/EP92/02806

§ 371 Date: Sep. 8, 1994

§ 102(e) Date: Sep. 8, 1994

[87] PCT Pub. No.: WO93/11474

PCT Pub. Date: Jun. 10, 1993

[30] Foreign Application Priority Data

Dec. 4, 1991 [DE] Germany .......... 41 39 945.5

[51] Int. Cl.⁶ .......... G06F 15/18; G06G 7/00
[52] U.S. Cl. .......... 395/3; 395/900; 395/50
[58] Field of Search .......... 395/3, 50–51, 395/60–61, 76, 900, 934

[56] References Cited

U.S. PATENT DOCUMENTS 5,025,499 6/1991 Inoue et al. .......... 395/900

FOREIGN PATENT DOCUMENTS 3-023813 of 0000 Japan .

OTHER PUBLICATIONS

Patent Abstracts of Japan, vol. 15, No. 141, 10 Apr. 1991 & Japanese Pat. No. 3–023823 (Omron tateisi Electron Co.) 31 Jan. 1991.
PT Electronica–Elektrotechniek, vol. 46, No. 3, Mar. 1991, Rijswijk NL, pp. 12–15, H. Hellendoorn "Redeneren Met Vage Logica".
Machine Design, vol. 62, No. 18, 6 Sep. 1990, Cleveland, US pp. 92–98, L.A. Berardinis "Tooling Up For The Information Age".
Vestli et al, "Integration of path planning, sensing and control in mobile robots"; Proceedings IEEE International conference on robotics and automation, pp. 243–248 vol. 3, 2–6 May 1993 May 1993.
Huang et al, "A self–paced fuzzy tracking controller for two–dimensional motion control"; IEEE Transactions on systems, man and cybernetics, vol. 20 iss. 5 pp. 1115–1124, Sep.–Oct. 1990 Oct. 1992.

Primary Examiner—Tariq R. Hafiz
Attorney, Agent, or Firm—Joseph S. Tripoli; Eric P. Herrmann

[57] ABSTRACT

Apparatus requiring a plurality of control signals is provided with a fuzzy logic controller. The fuzzy logic controller is programmed with a plurality of control functions. Respective parameters determinative of the control signals are applied to the fuzzy controller in time division multiplex fashion, and concurrently respective control signals provided by the fuzzy controller are time division multiplex applied to respective control signal paths.

7 Claims, 4 Drawing Sheets

METHOD AND APPARATUS FOR IMPLEMENTING TDM FUZZY CONTROL

The present invention relates to a control method and to a control circuit which effects control using fuzzy logic.

BACKGROUND OF THE INVENTION

An article by Günter Trautzl having the title "Unscharfe Logic: Fuzzy Logic" has appeared in "der electroniker", No. 3, 1990 at pages 39–43.

In addition to the expression Fuzzy logic for the term "unscharfe Logic", the names, Rule-Base-System, ambivalent logic and multiple value logic are common.

Fuzzy logic had been developed by 1965 in order to be able to also process sets of data that were incomplete or inexact. To this end, with the help of a functional relationship which is often referred to as a Membership-function, the control signal for a control circuit is obtained, for example, from a table of values.

In the said document, this control method is explained on the basis of a carriage on which a bar carrying a mass is fixed so as to be pivotal in the direction of movement of the carriage. The carriage is moved in a horizontal direction by the control circuit such that the bar carrying the mass does not fall over but rather is counter-balanced. Expressed in other words, this means that the carriage imitates the balancing ability of an acrobat who tries to balance a bar in the hollow of his hand.

The status of the bar is described by its angular speed and its angle of deflection which represent the input variables for the controller. The output variable is the speed of the carriage.

This control circuit is described in the following words in the said document:

"The set-up by means of fuzzy logic is as follows: The system has the two input variables, angle θ and angular speed w and an output variable, speed v. To start with, one gathers together all the input and output variables according to their values into groups and also provides the functional relationship thereof. For example, one splits the angle into the values, large-positive, middle-positive, small-positive, zero, small-negative, middle-negative, large-negative. Therein, by large, we mean all angles from 20 to 90 degrees (theoretical limit), by middle, all angles between 5 and 25 degrees, by small, all angles between 0 and 10 degrees, as zero, one admits all values between −0.5 degrees and +0.5 degrees. The Membership-function for large is such that, for example, all values above 45 degrees have the relationship factor of 1, but the relationship then drops in order to lie at 0.005 at 20 degrees. The range of values for w and for v is defined in a similar manner. In this way, one achieves an association of the system variables with the Membership-function.

The second part of the set-up for the solution consists in that a system of control is now established in the following form:

1. Rule: If θ is zero and w is zero, then v is equal to zero.
2. Rule: If θ is zero and w is small-positive, then v is equal to small-positive.
3. Rule: If θ is small-positive and w is zero, then v is equal to small-positive.
4. Rule: If θ is zero and w is small-negative, then v is equal to small-negative and so on. The whole system can be described by such a field of coarse, approximate rules (usually values based on experience)."

OBJECT OF THE INVENTION

The object of the invention is now, to develop a control method and a control circuit which effects control using fuzzy logic such that the most important requirements of a control circuit—precision, stability and speed—are fulfilled with the least possible expense.

SUMMARY OF THE INVENTION

In a method in accordance with the first part of claim 1, this object is achieved in that, a plurality of control paths are served by only a single fuzzy controller which is connected to the control paths on a time division multiplex basis.

In a control circuit in accordance with claim 2, this object is likewise achieved in that, a plurality of control paths are served by only a single fuzzy controller which is connected to the control paths on a time division multiplex basis.

BRIEF DESCRIPTION OF THE DRAWINGS

There is shown in

DETAILED DESCRIPTION

Figure 1:
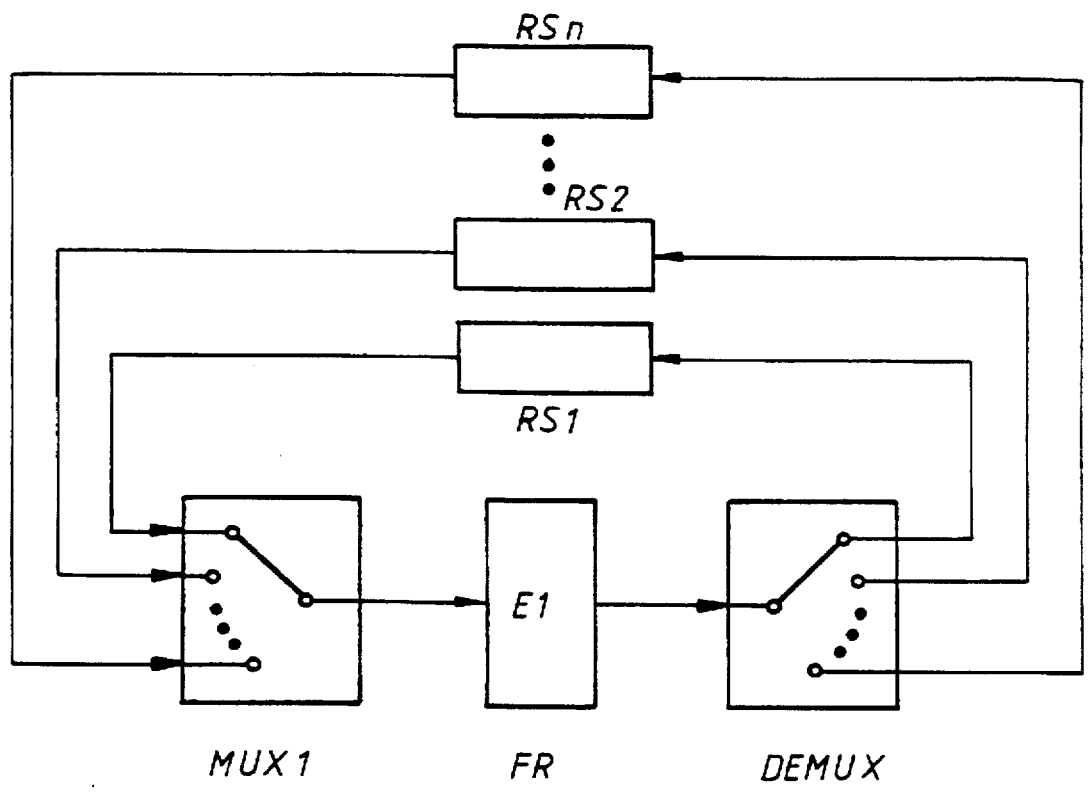
FIG. 1 a first embodiment of the invention.

The first embodiment of the invention depicted in FIG. 1 will now be initially described and thereafter its manner of operation will be explained.

The output of a multiplexer MUX1 is connected to the input E1 of a fuzzy controller FR whose output is connected to the input of a demultiplexer DEMUX. Each output of the demultiplexer DEMUX is connected to the input of a respective control path RS1 to RSn. The output of each control path RS1 to RSn is connected to a respective input of the multiplexer MUX1.

During the control operation, the adjustment signals for the individual control paths RS1 to RSn at the output of the fuzzy controller FR are distributed to the appertaining control paths by means of the demultiplexer DEMUX. The control-difference at the output of each control path RS1 to RSn is passed on by means of the multiplexer MUX1 to the input E1 of the multiplexer MUX1.

The second embodiment of the invention depicted in FIG. 2 will now be initially described and thereafter its manner of operation will be explained.

The output of a multiplexer MUX1 is connected to the input E1 of a fuzzy controller FR whose output is connected to the input of a demultiplexer DEMUX. Each output of the demultiplexer DEMUX is connected to the input of a respective digital-analogue converter DA1 to DAn. The output of each digital-analogue converter DA1 to DAn is connected to the input of a respective control path RS1 to RSn. The output of each control path RS1 to RSn is connected to the input of a respective analogue-digital converter AD11 to AD1n. The outputs of the analogue-digital converters AD11 to AD1n are connected to the inputs of the multiplexer MUX1. The outputs of a clock pulse generator TG are connected to the clock inputs of the demultiplexer DEMUX, the multiplexer MUX1, the digital-analogue converters DA1 to DAn and the analogue-digital converters AD11 to AD1n.

During the control operation, the analogue-digital converters AD11 to AD1n, the digital-analogue converters DA1 to DAn and also the demultiplexer DEMUX and the multiplexer MUX1 are synchronised by the clock rate of the clock pulse generator TG so that the adjustment signals for the individual control paths RS1 to RSn at the output of the fuzzy controller FR are passed on to the appertaining control paths.

The intrinsic advantage of the invention resides here in that a plurality of control circuits are served by only a single fuzzy controller which is connected to the individual control paths in time division multiplex. In accordance with the conventional method of automatic control, one controller would be required for each control path, which, moreover, would have to be optimised in each control path.

In accordance with the invention, the fuzzy controller FR receives the control-difference from each control path RS1 to RSn, which is delivered by the multiplexer MUX1 in time division multiplex. The digital control value required for each control-difference is produced in the fuzzy controller FR from the table of values in accordance with the functional relationship and is emitted via the output of the fuzzy controller FR to the input of the demultiplexer DEMUX which then passes the digital control values to the individual digital-analogue converters DA1 to DAn. Analogue adjustment signals now reach the individual control paths RS1 to RSn from the digital-analogue converters DA1 to DAn.

Figure 2:
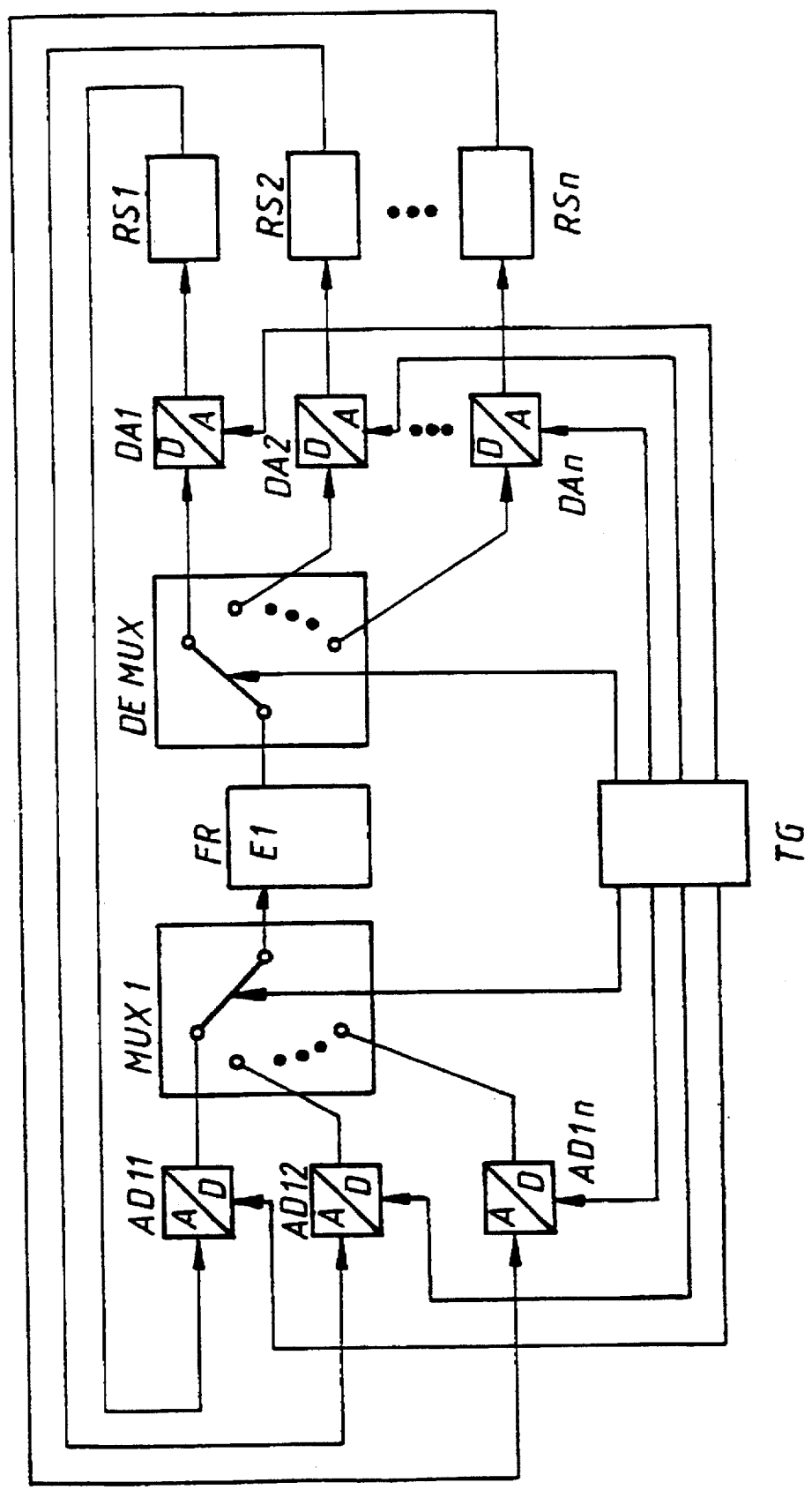
FIG. 2 a second embodiment of the invention.
Figure 3:
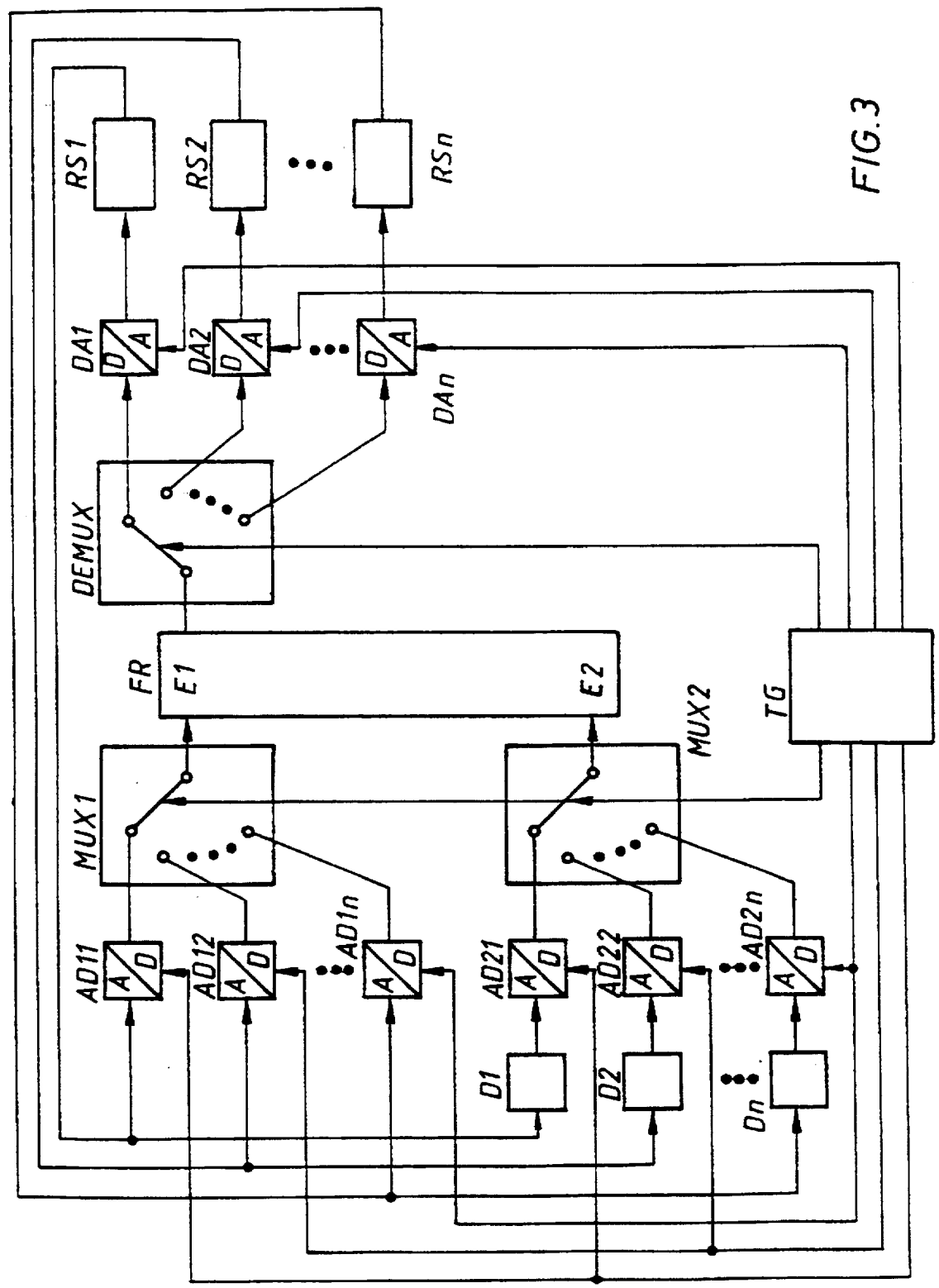
FIG. 3 a third embodiment of the invention.

A third embodiment is shown in FIG. 3 which is supplemented vis a vis the second embodiment of FIG. 2 by a second multiplexer MUX2, further analogue-digital converters AD21 to AD2n and differentiating elements D1 to Dn.

The output of each control path RS1 to RS2 is connected to the input of a respective differentiating element D1 to Dn. The output of each differentiating element D1 to Dn is connected to the input of a respective analogue-digital converter AD21 to AD2n. The outputs of the analogue-digital converters AD21 to AD2n are connected to the inputs of the multiplexer MUX2 whose output is connected to the second input E2 of the fuzzy controller FR. The clock pulse generator TG is connected to the clock inputs of the analogue-digital converters AD21 to AD2n.

The adjustment signal is determined from the table of values in the fuzzy controller FR, by means of the functional relationship, from the control-difference which is derivable at the output of the multiplexer MUX1, and, the differentiated control-difference which is derivable at the output of the multiplexer MUX2.

If the individual control paths RS1 to RSn are not too different, then the digital-analogue converters DA1 to DAn between the outputs of the demultiplexer DEMUX and the control paths RS1 to RSn may be replaced by one digital-analogue converter between the output of the fuzzy controller FR and the input of the demultiplexer DEMUX. Likewise, the analogue-digital converters AD11 to AD1n as well as AD21 to AD2n may be replaced by a respective analogue-digital converter between the output of the multiplexer MUX1 and the fuzzy controller FR and between the multiplexer MUX2 and the fuzzy controller FR.

Figure 4:
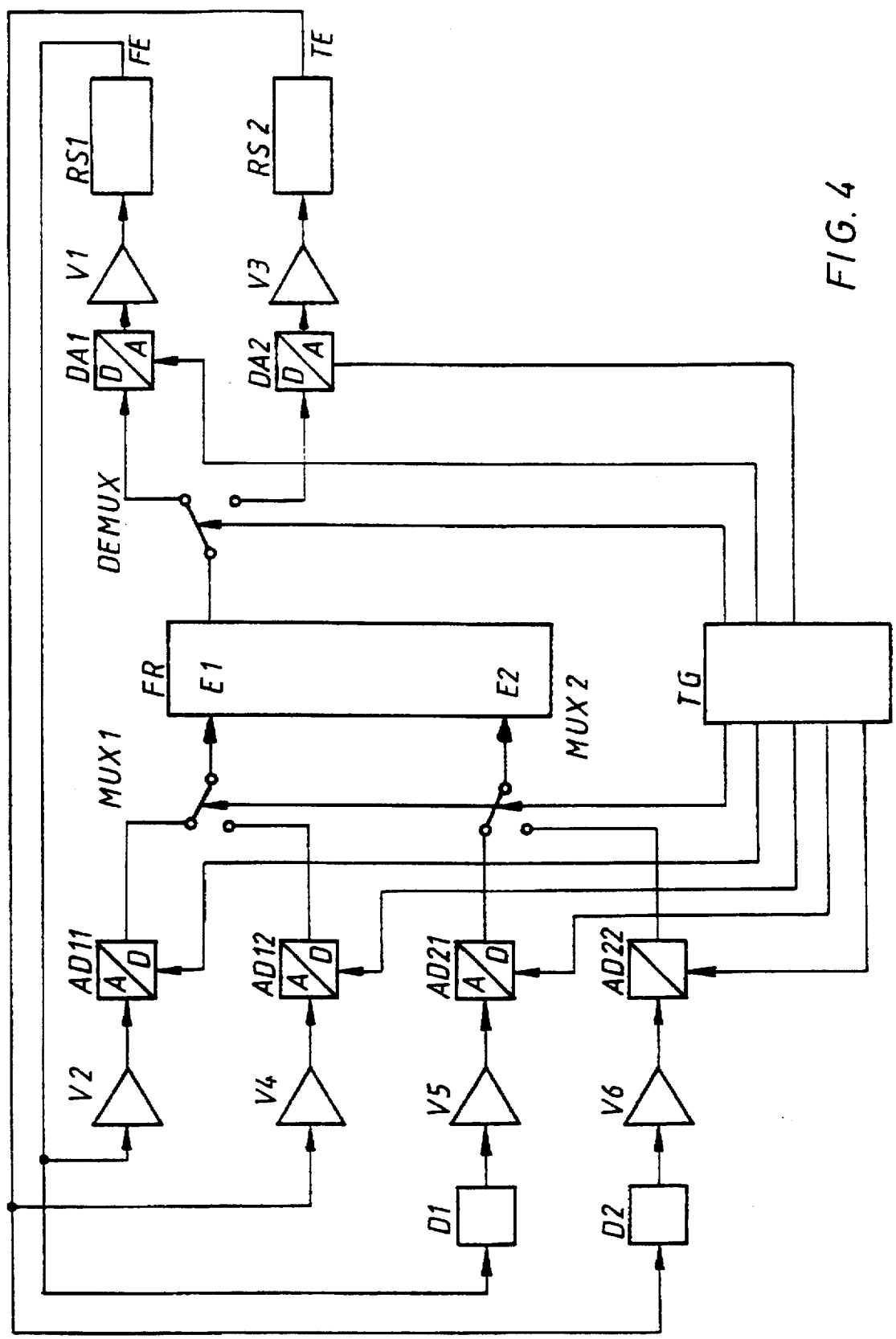
FIG. 4 a fourth embodiment of the invention for a tracking control loop and a focusing control loop.

A fourth embodiment is illustrated in FIG. 4. This is concerned with the focusing control loop and the tracking control loop of an optical reproduction device or of a magneto-optic recording and reproduction device.

In an optical reproduction device, in a CD player for example, a light beam is focused on the recording medium, the so-called compact disc, by a focusing control loop and is guided along the spiral-like data tracks of the compact disc by a tracking control loop.

The construction of the focusing control loop and tracking control loop shown in FIG. 3 will now be described.

The output of a fuzzy controller FR is connected to the input of a demultiplexer DEMUX whose first output is connected to the input of a digital-analogue converter DA1 and whose second output is connected to the input of a digital-analogue converter DA2. The output of the digital-analogue converter DA1 is connected via an amplifier V1 to the input of the control path RS1 whose output is connected to the input of an amplifier V2. The output of the digital-analogue converter DA2 is connected to the input of an amplifier V3 whose output is connected to the input of the control path RS2. The output of the control path RS2 is connected to the input of an amplifier V4 whose output is connected to the input of an analogue-digital converter AD12. The output of the amplifier V2 is connected to the input of an analogue-digital converter AD11. The outputs of the two analogue-digital converters AD11 and AD12 are connected to the inputs of a multiplexer MUX1 whose output is connected to the first input of the fuzzy controller FR. The output of the control path RS2 is moreover connected to the input of a first differentiating element D1 whose output is connected to the input of an amplifier V5. The output of the control path RS2 is connected to the input of a differentiating element D2 whose output is connected to the input of an amplifier V6. The output of the amplifier V5 is connected to the input of an analogue-digital converter AD21 whose output is connected to the first input of a multiplexer MUX2. The output of the amplifier V6 is connected to the input of an analogue-digital converter AD22 whose output is connected to the second input of the multiplexer MUX2. The output of the multiplexer MUX2 is connected to the second input E2 of the fuzzy controller. A clock pulse generator TG delivers the clock pulses for the demultiplexer DEMUX, the multiplexers MUX1 and MUX2, the digital-analogue converters DA11, DA12, the analogue-digital converters AD11, AD12, AD21 and AD22.

The control path RS1 is the focusing control path while the control path RS2 represents the tracking control path. The amplifiers V1 to V6 serve for level matching. For each focusing error signal FE which the focusing control path RS1 emits, the fuzzy controller searches in the table of values for the appertaining adjustment value with the aid of the differentiated focusing error signal. The fuzzy controller FR likewise searches in the table of values for the adjustment value appertaining to each tracking error signal TE at the output of the tracking control path RS2 with the aid of the differentiated tracking error signal. The focusing control path and the tracking control path thus alternately receive an adjustment signal on a time division multiplex basis.

The invention is not in any way limited to the servo-loops—the focusing control loop and the tracking control loop—of a CD player however, but is applicable over the whole field of automatic control systems. For example, the invention can, in advantageous manner, be utilised in known anti-blocking braking systems in vehicles, and generally in chemical process control, for example, exhaust gas purification plants.

In summary, the substantial advantages of the invention will be enumerated once more: a saving of controllers, a simple and universal applicability in the field of automatic control since optimisation is only required once, no adjustment of the servo-amplification, a virtual independence of alterations of the components and no drift of the control parameters as the result of temperature fluctuations.

I claim:

1. A control circuit which effects control using fuzzy logic, comprising:

a plurality of control paths (RS1, RS2, ..., RSn);

a single fuzzy controller (FR);

a first multiplexer (MUX1) having a plurality of inputs and having an output coupled to a first input (E1) of the fuzzy controller (FR);

a demultiplexer (DEMUX) having an input coupled to an output of said fuzzy controller and having a plurality of outputs;

a plurality of digital-analogue converters respectively coupled between respective outputs of said first demultiplexer and respective input connections of respective ones of said control paths;

a first plurality of analogue-digital converters (AD1, AD2, ..., ADn) respectively coupled between respective inputs of said first multiplexer and respective output connections of respective ones of said control paths;

a plurality differentiating elements (D1, D2, ..., Dn), having respective input connections coupled to output connections of respective ones of said control paths and having respective outputs;

a second plurality of analogue-digital converters (AD21, AD22, ..., ADn) having respective inputs coupled to respective outputs of said differentiating elements; and having respective outputs;

a second demultiplexer (DEMUX 2) having an output connected to a second input (E2) of the fuzzy controller (FR) and having a plurality of input connections respectively coupled to respective outputs of said second plurality of analogue-digital converters; and wherein said first and second multiplexers and said demultiplexer are conditioned to couple said fuzzy controller in a closed loop, sequentially with a control path and exclusive of other control paths.

2. Control circuit in accordance with claim 1, characterised in that, the digital control values for the individual control paths (RS1, RS2, ..., RSn) are stored in a table of values in the fuzzy controller (FR).

3. A control circuit which effects control using fuzzy logic, comprising:

a single fuzzy controller (FR) for the focusing control loop and the tracking control loop of an optical reproduction device or a magneto-optic recording and reproduction device in order to focus the light beam which is scanning the data on a disc-like recording medium onto the recording medium and to guide it along the data tracks of the recording medium;

a plurality of control paths (RS1, RS2, ..., RSn) including a focusing control path and a tracking control path;

a time division multiplexer for sequentially and exclusively connecting respective ones of the control paths (RS1, RS2, ..., RSn) concurrently to an input and an output of the fuzzy controller on a time division multiplex basis and wherein said fuzzy controller provides a control signal to a respective control path during respective connections of the sequence.

4. Control circuit in accordance with claim 3, characterized in that, the output of a first multiplexer (MUX1) is connected to the first input (E1) of the fuzzy controller (FR) whose output is connected to the input of a demultiplexer (DEMUX), that each output of the demultiplexer (DEMUX) is connected to the input to a respective control path (RS1, RS2, ..., RSn) and that the output of each control path (RS1, RS2, ..., RSn) is connected to a respective input of the first multiplexer (MUX1).

5. Control circuit in accordance with claim 3, characterized in that, the output of a first multiplexer (MUX1) is connected to the first input (E1) of the fuzzy controller (FR) whose output is connected to the input of a demultiplexer (DEMUX), that each output of the demultiplexer (DEMUX) is connected to the input of a respective digital-analog converter (DA1, DA2, ..., DAn), that a control path (RS1, RS2, ..., RSn) follows each digital-analog converter (DA1, DA2, ..., DAn), that an analog-digital converter (AD11, AD12, ..., AD1n) follows each control path (RS1, RS2, ..., RSn) and that the outputs of the analog-digital converters (AD11, AD12, ..., AD1n) are connected to the inputs of the first multiplexer (MUX1).

6. Control circuit in accordance with claim 3, characterized in that, the digital control values for the individual control paths (RS1, RS2, ..., RSn) are stored in a table of values in the fuzzy controller (FR).

7. A control circuit which effects control using fuzzy logic, comprising:

a single fuzzy controller (FR) for a focusing control loop and a tracking control loop of an optical reproduction device or a magneto-optic recording and reproduction device for focusing a scanning light beam on a disc-like recording medium and to guide it along data tracks of the recording medium;

a plurality of control paths (RS1, RS2, ..., RSn) including said focusing control loop and said tracking control loop;

a first multiplexer (MUX1 having a plurality of inputs and having an output coupled to a first input (E1) of the fuzzy controller (FR);

a demultiplexer (DEMUX) having an input coupled to an output of said fuzzy controller, and having a plurality of outputs;

a plurality of digital-analogue converters respectively coupled between respective output of said first demultiplexer and respective input connections of at least said focusing control loop and said tracking control loop;

a first plurality of analogue-digital converters (AD1, AD2, ..., ADn) respectively coupled between respective inputs of said first multiplexer and respective output connections of respective ones of said control paths including said focusing control loop and said tracking control loop;

a plurality differentiating elements (D1, D2, ..., Dn), having respective input connections coupled to output connections of respective ones of said control paths and having respective outputs;

a second plurality of analogue-digital converters (AD21, AD22, ..., ADn) having respective inputs coupled to respective outputs of said differentiating elements; and having respective outputs;

a second demultiplexer (DEMUX 2) having an output connected to a second input (E2) of the fuzzy controller (FR) and having a plurality of input connections respectively coupled to respective outputs of said second plurality of analogue-digital converters; and wherein said first and second multiplexers and said demultiplexer are conditioned to couple said fuzzy controller in a closed loop, sequentially with a control path and exclusive of other control paths.

\* \* \* \* \*